(12) United States Patent
Nakomcic

(10) Patent No.: US 6,389,810 B1
(45) Date of Patent: May 21, 2002

(54) WAVE ENERGY CONVERTER WITH FLOAT

(76) Inventor: Nenad Nakomcic, 4 Rose Street, Croydon Park, NSW 2133 (AU)

( * ) Notice: Subject to any disclaimer, the term of this patent is extended or adjusted under 35 U.S.C. 154(b) by 0 days.

(21) Appl. No.: 09/857,493

(22) PCT Filed: Dec. 23, 1999

(86) PCT No.: PCT/AU99/01142

§ 371 Date: Jun. 6, 2001

§ 102(e) Date: Jun. 6, 2001

(87) PCT Pub. No.: WO00/39457

PCT Pub. Date: Jul. 6, 2000

(30) Foreign Application Priority Data

Dec. 24, 1998 (AU) ............................................. 98228/98

(51) Int. Cl.⁷ ................................................. F03C 1/00
(52) U.S. Cl. ............................ 60/502; 60/398; 60/499; 60/498; 60/497
(58) Field of Search .......................... 60/398, 495, 496, 60/497, 498, 499, 502; 415/7

(56) References Cited

U.S. PATENT DOCUMENTS

| | | | | | |
|---|---|---|---|---|---|
| 3,952,517 A | * | 4/1976 | Decker | ........................ | 60/502 |
| 4,698,969 A | * | 10/1987 | Raichlen et al. | ............... | 60/502 |
| 4,914,915 A | * | 4/1990 | Linderfelt | ..................... | 60/502 |

FOREIGN PATENT DOCUMENTS

WO 85/04219 * 9/1985 .................. 60/502

* cited by examiner

*Primary Examiner*—Hoang Nguyen

(57) ABSTRACT

A device to convert vertical motion of waves in a body of water into useable work has hollow float (14) centrally mounted on vertical sleeve (16) sliding on fixed vertical shaft (10). Oscillations are converted into rotation via an opposing pair of pinion gears, transferring power from upstroke and downstroke respectively, by meshing with circular grooves (18) on sleeve (16). The device is protected from lateral and torsional forces of the waves by an encircling slotted wall (8). The float may be half filled with water to balance buoyancy and gravitational forces.

15 Claims, 4 Drawing Sheets

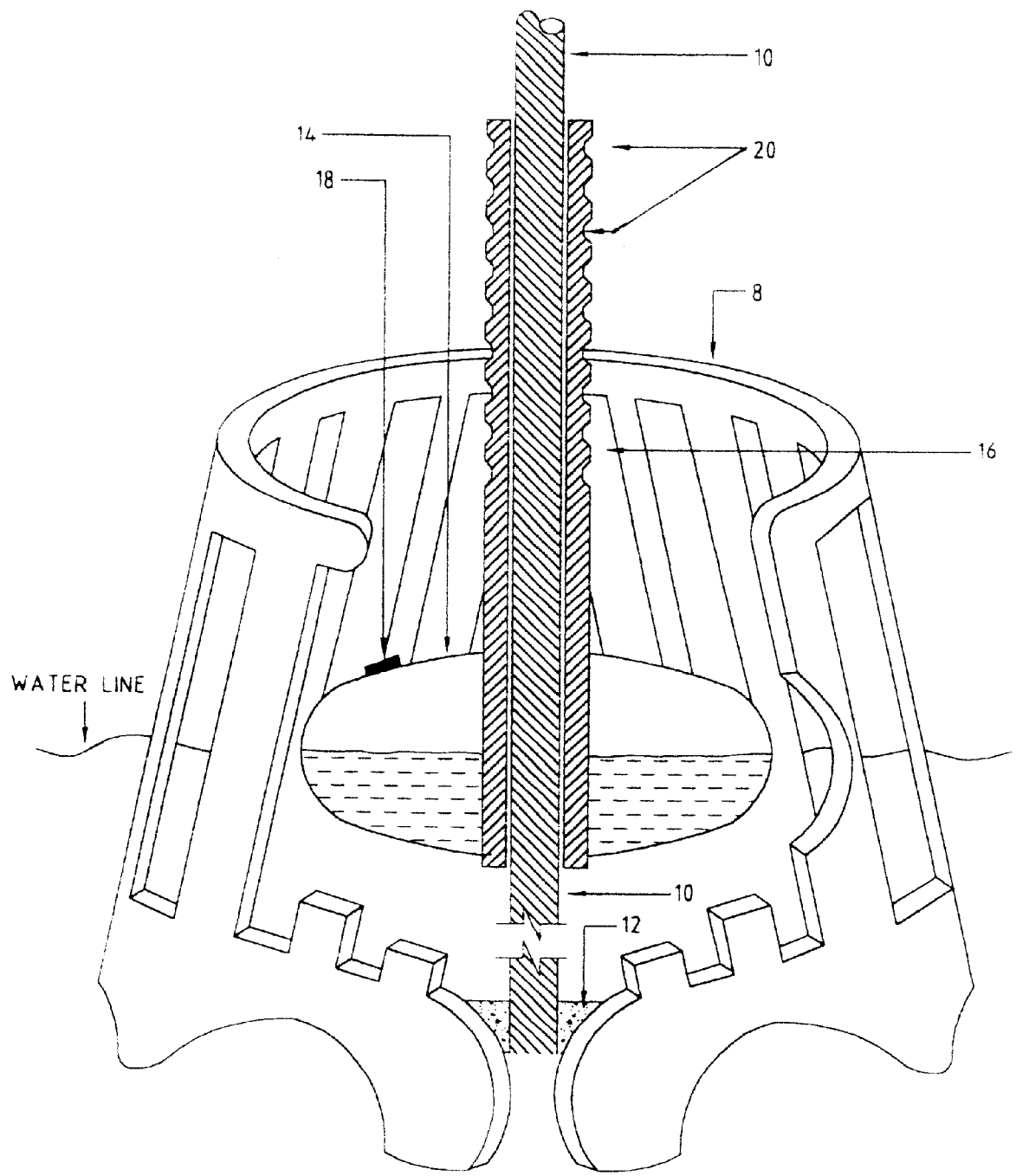
FIG. 1 n.t.s.

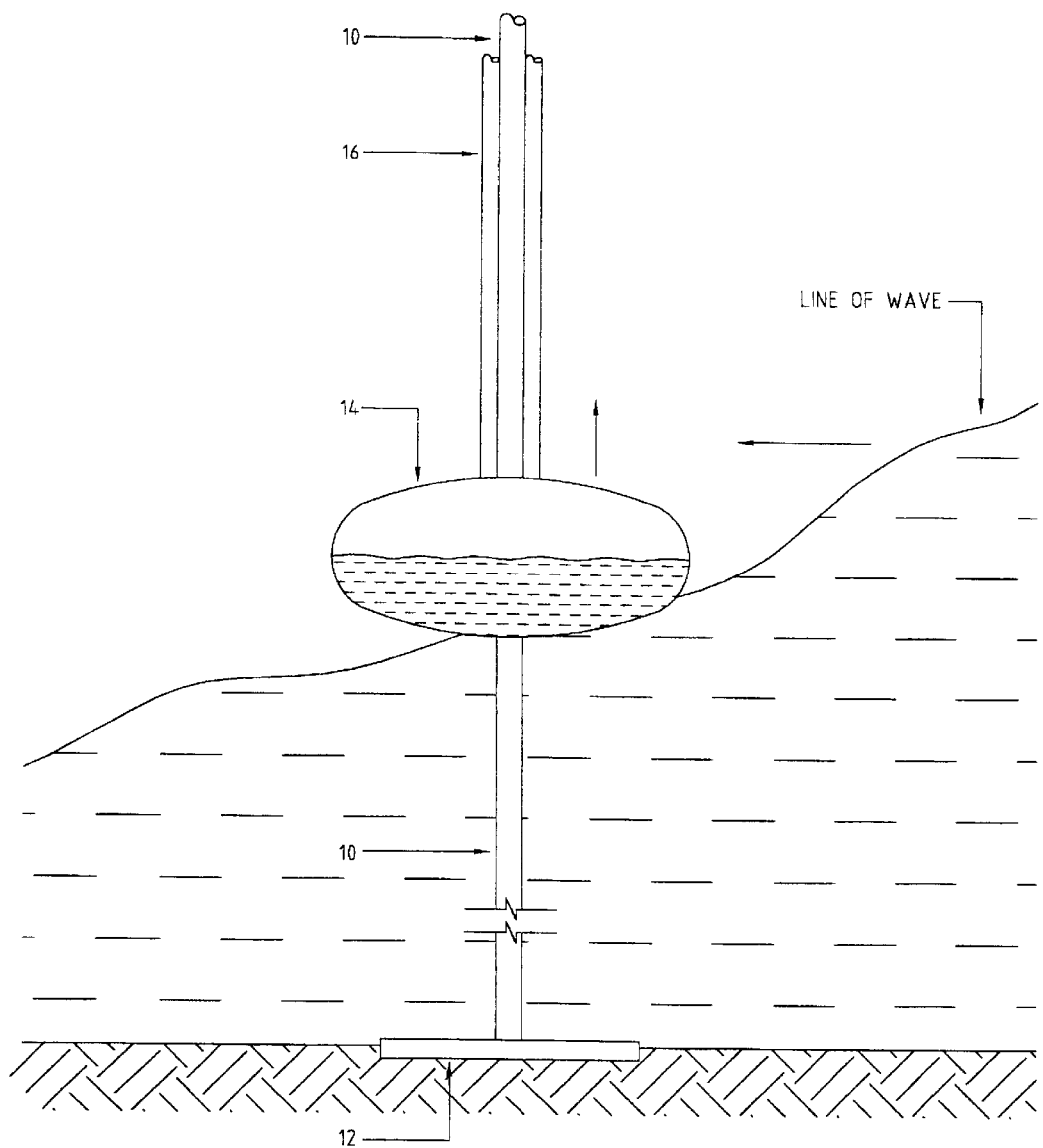
FIG. 2A n.t.s.

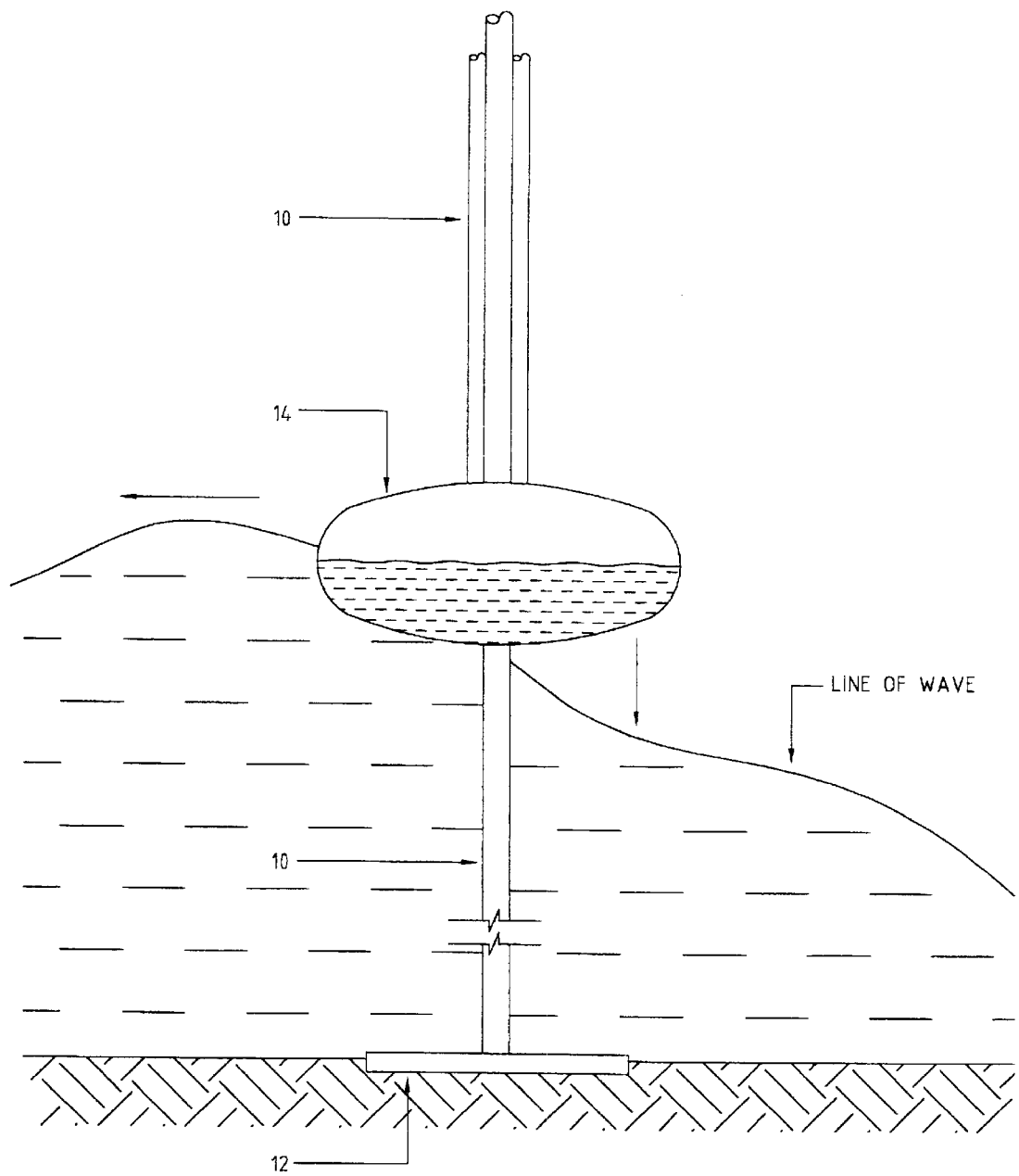
FIG. 2B n.t.s.

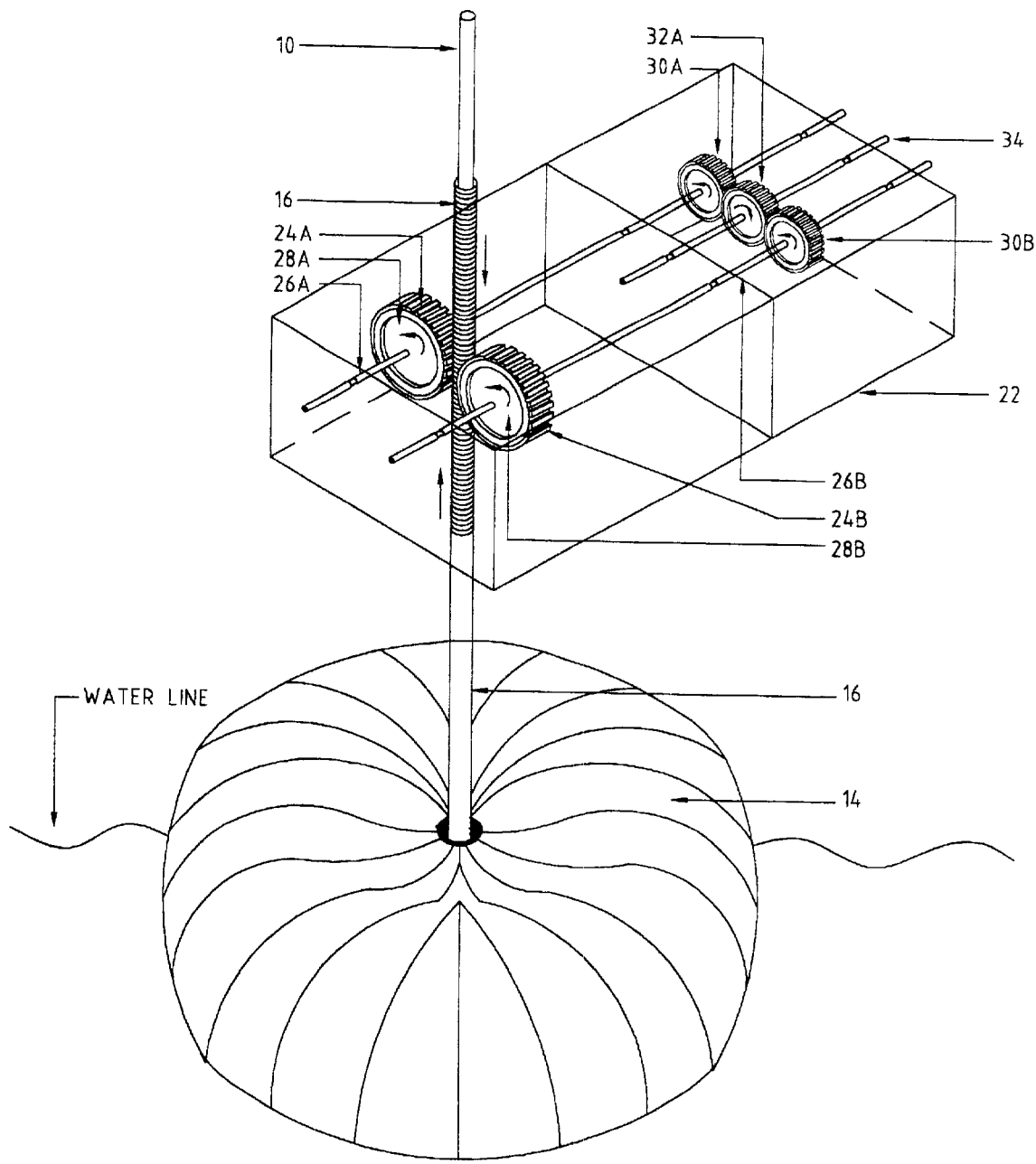
FIG. 3 n.t.s.

WAVE ENERGY CONVERTER WITH FLOAT

This invention relates to devices for converting the energy from waves in body of water.

It is desirable to be able to convert kinetic energy from water motion (waves) and from gravity force into mechanical energy, by a device which can provide self-sustainable form of power generation into readily available power source for further use.

In an order to fulfill above desire, the device has to function in an engine like manner. There have been many proposals to convert kinetic energy from water waves, but Prior proposals have not enabled this to be done in satisfactory way.

Specifically, it has not been possible to readily use the power output from these devices for the universal application. For an example, one previous device for conversion of wave power, known as "Oscillating Water Column" comprises of partially submerged open tubes. As the wave passes, the water height within the tube changes, driving displaced air through turbine situated at the top of the tubes. Disadvantages in this device is in its irregular volume of air supplied to turbines, its dependency on large volume of displaced air needed to produce viable power output and no storage of energy.

Another example is a barge, which receives water from the waves and guides the collected water to turbines. A disadvantage in this device is a very similar to O.W.C. Yet another example is a few proposals to position a float in a body of water to reciprocate. Disadvantages in these previous ("float") devices are, lack of control to they reciprocating strokes, unbalanced power output of each stroke where the forces of up and down strokes are not synchronized, total and uncontrollable exposure to sweeping power of waves and severely-harsh weather, also, they have no storage of energy. All of these proposed devices share the same or similar disadvantages, and as such they are not an engines since they do not function like an engines.

If an energy conversion device is to function like an engine-it will have to perform-contain three "fundamental elements":

The first "fundamental element" is an energy-power source, to initiate a motion.

The second "fundamental element" is an energy-power source to maintain a motion.

And third "fundamental element" is storage of the energy for further use.

These problems are overcome by the present invention, which is based on/and contains all three "fundamental elements", it is an engine.

This invention, Kinetic Engine, aims to provide a device to harness a combination of kinetic energy from motion of water (caused by waves) and potential kinetic energy induced by gravity force. The invention provide device for installation in body of water, comprising a fixed vertical shaft, a float mounted on the fixed shaft so as to allow vertical movement therealong, such that the float is reciprocated vertically along the shaft by the alternate actions of buoyancy and gravity forces as each wave passes the device, and power takeoff means driven by reciprocation of the float, wherein the float is surrounded by a tubular, slotted wall which spreads water around the float to produce even uplift and to shield the float from lateral and torsional forces of each wave.

In one embodiment, the power takeoff means includes means for transferring the linear reciprocation of the float to a rotary output shaft. Preferably, this means includes the pair of gears driven by a rack connected to the float, each of the gears freewheeling when driven in one direction and transferring power when driven in the opposite direction, such that one of said gears transfers power to power output means on an upstroke of the float and the other of said gears transfers power to said power output means on a downstroke of the float. Desirably, each of said gears drives a respective shaft, said shafts being connected by further gears to provide a relatively smooth and continuous power output rotating in a single direction upon both upstroke and downstroke.

Further preferred embodiments will now be described with reference to the accompanying drawings, in which:

FIG. 1 is a schematic elevational cross section of the device;

FIG. 2A and 2B are schematic elevations showing operation of the device upon, respectively, upstroke and downstroke; and FIG. 3 is schematic isometric view of a preferred gearbox arrangement.

With reference to FIG. 1, the device includes a tubular, slotted wall 8 encircling a vertical shaft 10 having a base 12 embedded in the sea floor or otherwise fixed in position. The wall height is above expected range of wave peak and the shaft length extends over substantially the entire height of the wall A float chamber 14 is mounted on a sleeve 16 which in turn is mounted for sliding along the shaft. The float chamber may be constructed of any suitably strong and corrosion—resistant material, for example metal alloys, fiberglass, molded plastics. or wood. The float chamber may be formed of single—piece construction with single or plurality of compartments to hold either, weight media/ water, or air, or combined water and air.

The float chamber has an inlet/outlet 18 and closure on it upper surface, through which the chamber is part filled with water drawn from the surroundings. Preferably, The chamber is approximately half filled with water and reminder with air, whereby air can be filled at atmospheric or higher pressure. By adding or decreasing amount of liquid weight media/water inside the floats chamber, it is possible to balance buoyancy and gravity forces for smooth reciprocating operation. The float is preferably circular in plain view, preferably, spherical or ellipsoidal in shape, so as to minimize torsion and lateral forces on the device from the waves.

The float is furthermore protected from damage with surrounding tubular, slotted wall (FIG. 1) which shield the float from lateral and torsion forces from the wave without diminishing the wave height (rise of water level) which drives the linear motion of the float. In anticipation of extreme weather conditions and to prevent any possible damage to the device, the float can be flooded completely to send it to sea floor.

The water can be pumped out once the extreme conditions have passed.

As the water surface rises with the approach of a wave, the buoyancy force, (it is the first of "fundamental element"—power source to initiate a motion) lifts the float on the rising surface of the wave (FIG. 2A). At this point, the tubular, slotted wall which surrounding the float (FIG. 1) is of crucial importance as it spread water around the float to provide even uplift. The amounts of energy involved can be enormous.

As the wave peak passes, the weight of the float with weight media (the water inside the float) momentarily are at a point of rest. This is the peak of the upstroke and the point at which the gravitational potential energy is at its maximum. As the (outside) water level drops (see FIG. 2B) the downward trust is produced by gravity force through the water inside the float (it is the second "fundamental element"—power source to maintain a motion) without the counteracting effect of buoyancy. During the down stroke, the float loses potential energy and gains kinetic energy, which is converted by the device in to mechanical energy in linear motion. Just before the float comes to rest on the water surface at the wave trough, the whole of the float's kinetic energy has been converted to mechanical energy, at this point a full energy conversion cycle is completed and the next cycle begins as the water surface rises.

In the illustrated embodiment, the sleeve 16 on which the float 14 is mounted extends above the float to provide a connection to the power takeoff. Preferably, the upper portion of the sleeve has a series of regularly spaced grooves 18 therein. This grooved portion 20 of the sleeve acts as a gear rack for the gear box 22 in FIG. 3, as discussed below. As the rack is cylindrical, it can rotate with any torsion force applied to the float, without transferring significant torque to gear arrangement.

Referring to FIG. 3, a gearbox is provided to convert the linear motion of the float into rotation. The gearbox 22 has an opposed pair of pinion gears 24a, 24b matching in profile and pitch with the rack, and each mounted on a respective horizontal shaft 26a, 26b. Each pinion is clutch—or ratchet—mounted on the shaft so as to engage and drive the shaft when the pinion is rotated in the direction of the respective arrow 28a, 28b, but to freewheel on the shaft when rotated in the opposite direction. Thus, when the float 14 and sleeve 16 are rising, pinion 24a is driving its shaft 26a anti clockwise (as shown in FIG. 3), while pinion 24b is freewheeling clockwise relative to its shaft 26b. When the float 14 and sleeve 16 fall, pinion 24b drives shaft 26b while pinion 24a freewheels.

Shafts 26a, 26b may in addition have fixed gear wheels 30a, 30b joined by a jockey gear 32. When shaft 26a is being driven, the jockey gear 32 drives shaft 26b in the same direction, and vice versa, such that each of the shafts rotates during both rising and falling of the float. Any one or more of shafts 26a, 26b or the jockey wheel shaft 34 can be used as the power output shaft, to lead to a generator (not shown) or other power generation device. (this is the third of "fundamental element"—storage of energy for further use).

The gearbox arrangement of FIG. 3 is advantageous in that it is adapted to cope with variations in wave amplitude, as distinct from a cam arrangement which requires fixed amplitude.

In an unillustrated alternative, the reciprocation of the float and sleeve may drive a hydraulic or pneumatic ram.

While FIGS. 1 to 3 illustrate only a single device, it will be appreciated that a plurality of the devices can be linked to provide a power "farm". The optimal size, mass and number of the devices may vary between sites according to typical local ocean condition, for example wave height and frequency.

As an alternative to installing the devices in a position where the waves travel past the device, it will be more desirable, as it is ideal for, to be installed along a breakwater or other impediment to the wave travel and be lifted by the surge produced as each wave strikes the impediment.

While particular embodiments of this invention have been described, it will be evident to those skilled in the art that the present invention may be embodied in other specific forms without departing from the essential characteristics thereof. The present embodiment and examples are therefore to be considered in all respects as illustrative and not restrictive, the scope of the invention being indicated by the appended claims rather then the foregoing description, and all changes which come within the meaning and range of equivalency of the claims are therefore intended to be embraced therein.

The claims defining the invention are as follows:

1. A kinetic engine for installation in a body of water, including a fixed vertical shaft, a float mounted on the fixed shaft and vertically movable therealong, such that the float is reciprocated vertically along the shaft by the alternate action of buoyancy and gravity forces as each wave passes the device, and power takeoff means driven by reciprocation of the float, wherein the float is surrounded by a tubular wall having a plurality of openings spaced evenly thereabout to spread water around the float to produce even uplift and to shield the float from lateral and torsion forces of each wave.

2. A kinetic engine according to claim 1 wherein the float has a chamber/chambers adapted to be partially or fully filled with water.

3. A kinetic engine according to claim 1 wherein the float may be substantially filled with water to submerge the float.

4. A kinetic engine according to claim 1 wherein the float has a chamber/chambers adapted to be filled with air to an Atmospheric or higher pressure.

5. A kinetic engine according to claim 1 wherein the float is centrally mounted on a sleeve, which is slidably mounted on the fixed shaft, the sleeve extending above the float to provide connection to the power takeoff means.

6. A kinetic engine according to claim 5 wherein a power takeoff means incorporates a hydraulic or pneumatic ram.

7. A kinetic engine according to claim 5 wherein the sleeve incorporates gear rack means.

8. A kinetic engine according to claim 7 wherein the gear rack means comprises a series of spaced circular grooves in a portion of the sleeve.

9. A kinetic engine according to claim 7 or 8 wherein the power takeoff means includes a gear means driven by the gear rack means.

10. A kinetic engine according to claim 9 wherein the gear means includes an opposed pair of pinion gears driven by gear rack means, one of the pinion gears transferring power from an upstroke of the float and the other of said pinion gears transferring power from a downstroke of the float.

11. A kinetic engine according to claim 10 wherein each of said pinion gears has a respective pinion shaft, each pinion being mounted on its shaft so as to drive rotation of the shaft when the pinion gear is rotated in one direction and to freewheel in the opposite direction.

12. A kinetic engine according to claim 11 wherein said pinion shafts are connected via a jockey gear so as to rotate a power output shaft in a constant direction upon both upstroke and downstroke of the float.

13. A kinetic engine according to claim 1 wherein the float has a chamber/chambers adapted to contain liquid weight media for the purpose of balancing forces of strokes, with said liquid weight media being lifted to an uppermost position with no transfer of energy to the float or from the float during the upstroke, where potential kinetic energy of the said weight media is converted to mechanical energy during downstroke.

14. The kinetic engine of claim 1 wherein said openings are slots.

15. The kinetic engine of claim 7 wherein the sleeve and gear rack means are rotatably mounted to the fixed shaft.

* * * * *